(12) United States Patent
Lagosz-Sinclair et al.

(10) Patent No.: US 10,873,177 B2
(45) Date of Patent: Dec. 22, 2020

(54) CIRCUIT BREAKER RACKING SYSTEM AND METHOD

(71) Applicant: ULC ROBOTICS, INC., Hauppauge, NY (US)

(72) Inventors: Benjamin J. Lagosz-Sinclair, North Baldwin, NY (US); Robert E. Kodadek, III, Long Beach, NY (US)

(73) Assignee: ULC Robotics, Inc., Hauppauge, NY (US)

( * ) Notice: Subject to any disclaimer, the term of this patent is extended or adjusted under 35 U.S.C. 154(b) by 226 days.

(21) Appl. No.: 15/801,788

(22) Filed: Nov. 2, 2017

(65) Prior Publication Data

US 2018/0205207 A1 Jul. 19, 2018

Related U.S. Application Data

(60) Provisional application No. 62/416,297, filed on Nov. 2, 2016.

(51) Int. Cl.
| | |
|---|---|
| *H02B 3/00* | (2006.01) |
| *H02B 1/34* | (2006.01) |
| *H02B 11/127* | (2006.01) |
| *H02B 11/02* | (2006.01) |

(52) U.S. Cl.
CPC ............. *H02B 3/00* (2013.01); *H02B 1/34* (2013.01); *H02B 11/127* (2013.01); *H02B 11/02* (2013.01)

(58) Field of Classification Search
CPC ........ H01R 13/44; H02B 11/18; H02B 11/20; H02B 11/24; H02B 11/02; H02B 11/127; H02B 1/34; H02B 3/00
See application file for complete search history.

(56) References Cited

U.S. PATENT DOCUMENTS

| | | |
|---|---|---|
| 8,063,323 B1 | 11/2011 | Ledbetter |
| 8,151,452 B2 | 4/2012 | Ledbetter |
| 8,161,631 B1 | 4/2012 | Ledbetter et al. |
| 8,164,875 B1 | 4/2012 | Ledbetter et al. |

(Continued)

OTHER PUBLICATIONS

Wong, Alex, Boston University ECE Senior Design Capstone Project, "BreakerBot," retrieved from http://eng.lx-designs.com/portfolio/breakerbot/ on Jan. 18, 2018.

(Continued)

*Primary Examiner* — Carl J Arbes
(74) *Attorney, Agent, or Firm* — Brooks Kushman P.C.

(57) ABSTRACT

A circuit breaker racking system and method may include a movable A-frame operable to attach to and release a circuit breaker, and move it forward and rearward along two space-apart arms. Rails associated with each of the arms may be movable upward and downward to lift and release the circuit breaker from a floor or platform. A drive screw assembly on the circuit breaker racking system may be actuated to pull a circuit breaker forward out of a cabinet or to push the circuit breaker back into the cabinet by engaging with a screw mounted to a wall of the cabinet. The circuit breaker racking system may be manually operated and moved about a control room, or may be remotely moved and actuated by an operator outside of the control room.

15 Claims, 13 Drawing Sheets

(56) References Cited

U.S. PATENT DOCUMENTS 8,465,305 B2 * 6/2013 Wilkie .................. H02B 11/24
439/137
9,059,530 B2 * 6/2015 Byrne ................ H01R 13/4534

OTHER PUBLICATIONS

BreakerBot, posted by Bigbys-Hand, uploaded May 1, 2016, retrieved from https://www.youtube.com/watch?v=yyhNmTSDY2Q&feature=youtu.be on Jan. 18, 2018.
CBS ArcSafe, Inc., Remote Circuit Breaker Racking System Brochure, retrieved from https://cbsarcsafe.com/products/remote-racking-solutions/remote-racking-systems/rrs-1/ on Jan. 18, 2018 (8 pages).
Powell Electrical Systems, Inc., Instruction Bulletin—01.41B. 65220, Lift Devices, Jun. 2017 (34 pages).

* cited by examiner

CIRCUIT BREAKER RACKING SYSTEM AND METHOD

CROSS-REFERENCE TO RELATED APPLICATIONS

This application claims the benefit of U.S. provisional application Ser. No. 62/416,297 filed Nov. 2, 2016, the disclosure of which is hereby incorporated in its entirety by reference herein.

TECHNICAL FIELD

The present disclosure relates to a circuit breaker racking system and method.

BACKGROUND

Because of high electrical demands in urban areas, the need for efficient circuit breaker restoration during peak operational seasons is very desirable. In an electrical substation, circuit breakers are used to interrupt any short-circuits or overload currents that may occur on the network. Some indoor electrical substations utilize 13 kilovolt (kV) and 27 kV circuit breakers that are racked in and out of position when: (i) the feeder needs to be processed with a "ground-and-test" (G&T) device to support field fault locating, repair, and restoration activities, or (ii) if the circuit breaker installed in the cabinet needs to be swapped-out for maintenance or post trip-out investigations. The process of removing and installing the circuit breakers from their positions and moving them around the substation introduce a number of issues that need to be addressed.

Currently, the medium-voltage circuit breakers in a 13 kV switchgear lineup use a motor-operated or hand-cranked mechanism to separate the breaker from its enclosure. Each circuit breaker can weigh between 400 pounds (lb.) and 800 lb. and are provided with caster wheels to aid manual pushing by operators on the substation floor. Circuit breakers are typically housed in a metal enclosure—i.e., a cabinet—that also houses a circuit breaker racking mechanism. These cabinet lineups house multiple circuit breakers, any of which may need to be racked in or out at any point.

To remove a circuit breaker from the "connect" position, an operator may insert a racking tool into an opening on the circuit breaker door and into the racking mechanism. A hand crank is pushed-in to engage the racking mechanism within the cabinet and the operator manually cranks the tool to disengage the circuit breaker from the copper bus connections in the back of the cabinet. Occasionally during the course of "racking" a breaker—i.e., the act of removing or installing a circuit breaker—an electrical arc becomes uncontained, resulting in an undesirable arc flash. To help to ensure that operators and technicians are not exposed to an arc flash, and to make the racking of circuit breakers more efficient, an automated system and method for circuit breaker racking is needed.

SUMMARY

At least some embodiments described herein may be capable of one or more of the following: (a) being driven to and from cabinets, local positions, holding areas, and a home base, (b) maneuvering breakers between cabinets and designated temporary and permanent storage locations, (c) semi-autonomously or autonomously installing and removing circuit breakers and G&T devices from cabinets, (d) sensing obstructions in the path of the robot and autonomously ceding motion to avoid collision, and (e) communicating wirelessly via an existing infrastructure or via a standalone wireless network. At least some embodiments described herein may also have one or more of the following features, the ability to: (a) navigate from the charging station to the specified circuit breaker bay, (b) identify the location, aisle, cabinet, or some combination of these, specified in the operating orders using autonomous or semiautonomous operation or via navigation using pre-programmed floorplans or maps, (c) align the robot with the cabinet specified in the operating orders, (d) navigate to designated holding areas to deposit and pick up circuit breakers and G&T devices, (e) align to the circuit breakers and G&T devices, and (f) return to a home base for charging.

At least some embodiments described herein may provide one or more of the following advantages over current systems and methods for racking circuit breakers: (a) no custom programming or configuration required for substations having different layouts and operating environments; (b) no alteration or changing of the substation infrastructure or its appearance—e.g., markings and indications on the floor or on equipment may not be required where the operator can identify the equipment and locations using a system-provided video; (c) a large number of intervention points for the operator—i.e., the ability to see the system and its surroundings to give the operator confidence that the robot is successfully performing the operations and is maintaining a safe environment; (d) a DVR-based or other video recording system that will allow the operator to the record operations and system surroundings; this will speed up troubleshooting since operators can record clips and submit them for phone or online support to the system designer or manufacturer; (e) the ability to integrate sensors into the environment, which may be detected by the system to provide an added layer of position or location feedback; and (f) operators may be able to complete all the operations remotely without having to approach the cabinet where the circuit breaker is housed.

In at least some embodiments described herein, the system may follow the same or similar procedures on a G&T device as are used on the circuit breaker itself. One exception may be that the G&T device is temporarily racked, and after the testing is complete, it is removed and returned to a predetermined date it storage location.

At least some embodiments described herein may include circuit breaker racking system having a support structure including first and second arms disposed opposite each other for positioning along opposite sides of a circuit breaker. A lift arrangement may include a first rail disposed on the first arm and configured to engage a first side of the circuit breaker, a second rail disposed on the second arm and configured to engage a second side of the circuit breaker, and a drive system operable to raise the first and second rails such that the circuit breaker is raised. The first and second rails may each include a respective ramped portion, and the lift arrangement may further include a first roller positioned to contact the ramped portion of the first rail and a second roller positioned to contact the ramped portion of the second rail. The drive system may be operable to move the first and second rollers horizontally to raise the first and second rails.

At least some embodiments described herein may include a circuit breaker racking system having a support structure including a pair of arms disposed across from each other for positioning along respective sides of a circuit breaker. A lift arrangement including a pair of rails may each be attached to a respective one of the arms and include a slotted portion.

A pair of rollers may each be configured to move along a respective one of the slotted portions to move the rails upward and downward for raising and lowering the circuit breaker.

At least some embodiments described herein provide a method for circuit breaker racking using a circuit breaker racking system having a support structure and a lift arrangement including a pair of rails. The method may include the steps of positioning the support structure proximate to a circuit breaker, and moving a plurality of rollers horizontally in one direction to move the rails vertically upward and engage the circuit breaker to move the circuit breaker upward. The circuit breaker may be moved into a position for connection to an electrical power source, and the circuit breaker remotely moved with a portion of the support structure toward a connection to the electrical power source. The rollers may be moved horizontally in a direction opposite the one direction to move the circuit breaker downward, and the circuit breaker may be remotely moved horizontally to connect the circuit breaker to the electrical power source.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
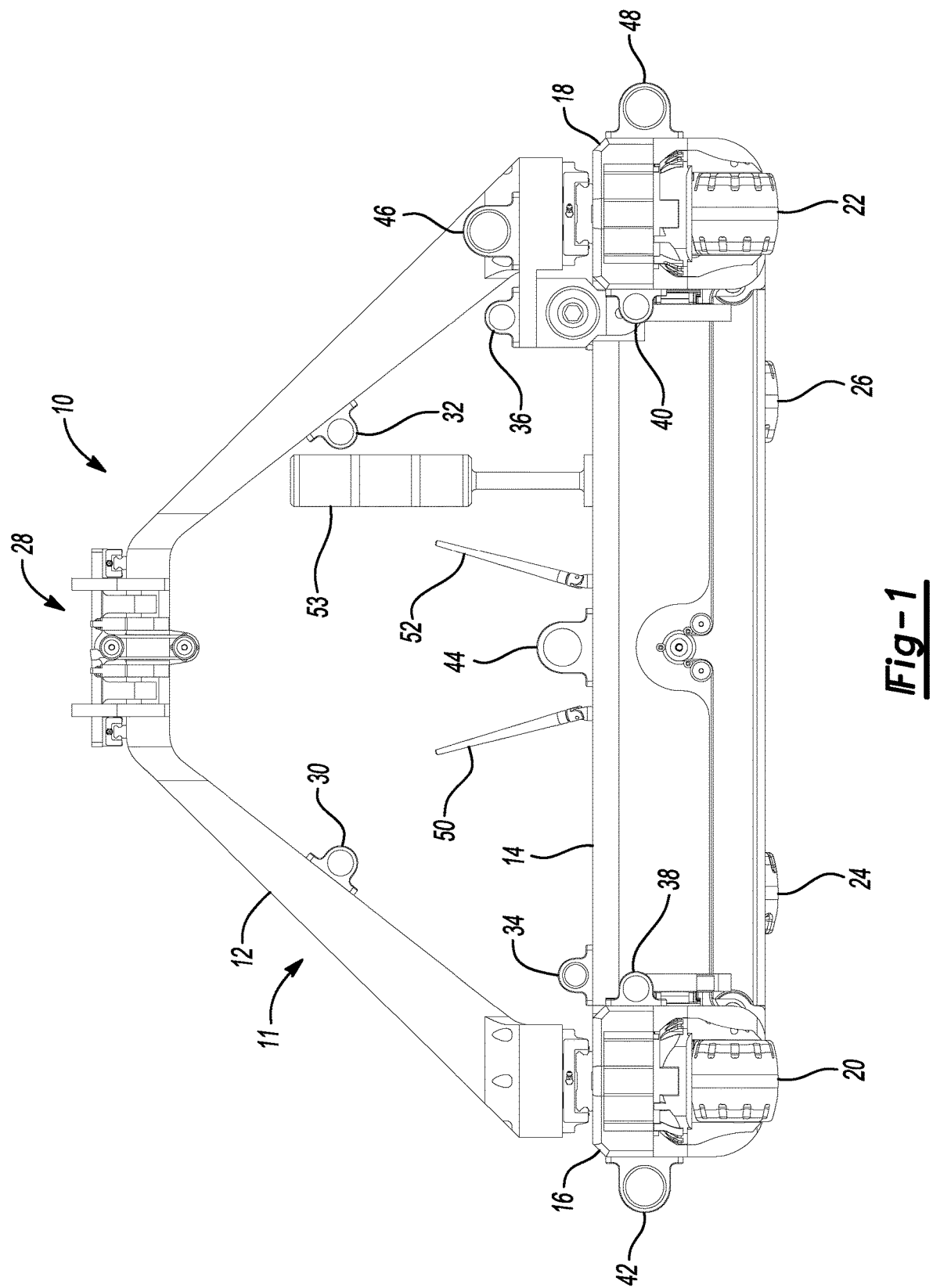
FIG. 1 shows a front view of a circuit breaker racking system in accordance with embodiments described herein.

FIG. 1 shows a front view of a circuit breaker racking system 10 in accordance with embodiments described herein. The racking system 10 includes a support structure 11 with a frame, which in this embodiment is an A-frame structure 12. The support structure 11 also has a cross-member 14 at its base, and first and second arms 16, 18 extending forwardly from the cross-member 14. At the front of the arms 16, 18 are wheels 20, 22, respectively. Also shown in FIG. 1 are two additional wheels 24, 26, which are attached to the cross-member 14. The A-frame structure 12 includes a hook arrangement 28, which may be used for engaging a circuit breaker. The system 10 is provided with a number of proximity sensors 30, 32, 34, 36, 38, 40. The proximity sensors 30, 32, 34, 36, 38, 40 may be useful to an operator of the system 10, particularly in situations where the circuit breaker room may not be well-lit. The system 10 may include one or more lights—e.g., light emitting diodes (LED's) or other types of lights—to further aid in navigating in low visibility. The system 10 also includes several cameras 42, 44, 46, 48, which may provide video feedback to an operator who is actuating the system 10 remotely. The camera 46 travels with the vertical triangular frame to provide visual feedback that the breaker is racked-in. Antennas 50, 52 are provided for wireless communication to and from the system 10 when it is being remotely controlled. An indicator light arrangement 53 may be included to provide operating status of the system 10, for example, using lights of different colors.

Figure 2:
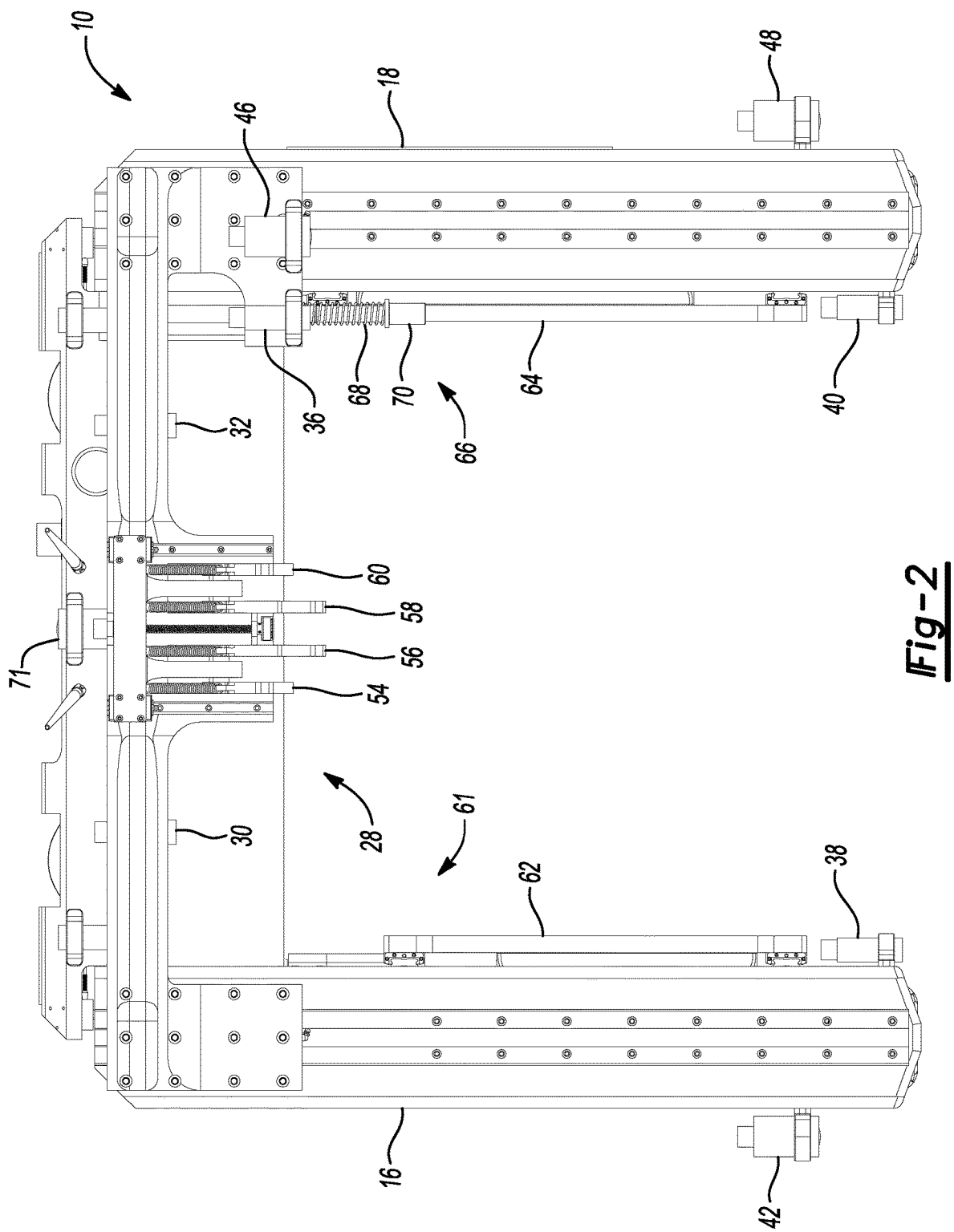
FIG. 2 shows a top view of the circuit breaker racking system shown in FIG. 1.

FIG. 2 shows a top view of the system 10, illustrating a number of additional features. For example, the hook arrangement 28 includes four hooks 54, 56, 58, 60, which can be actuated to engage with a handlebar of a circuit breaker—see, e.g., FIGS. 7-9. Also shown in FIG. 2 is a lift arrangement 61 that includes two rails 62, 64 attached to the inside of the arms 16, 18, respectively. As explained in more detail below, the rails 62, 64 are configured so they can be positioned below a portion of a circuit breaker—for example, rollers on the sides of a circuit breaker—and then engaged to lift upward such that the entire circuit breaker is lifted from the floor or platform where it sits. A screw-drive assembly 66 includes a drive screw 68 and a head 70, which may have a hexagonal or other-shaped opening to engage a screw on a cabinet of a circuit breaker. Also shown in FIG. 2, is a camera 71 oriented toward the back of the system 10.

Figure 3:
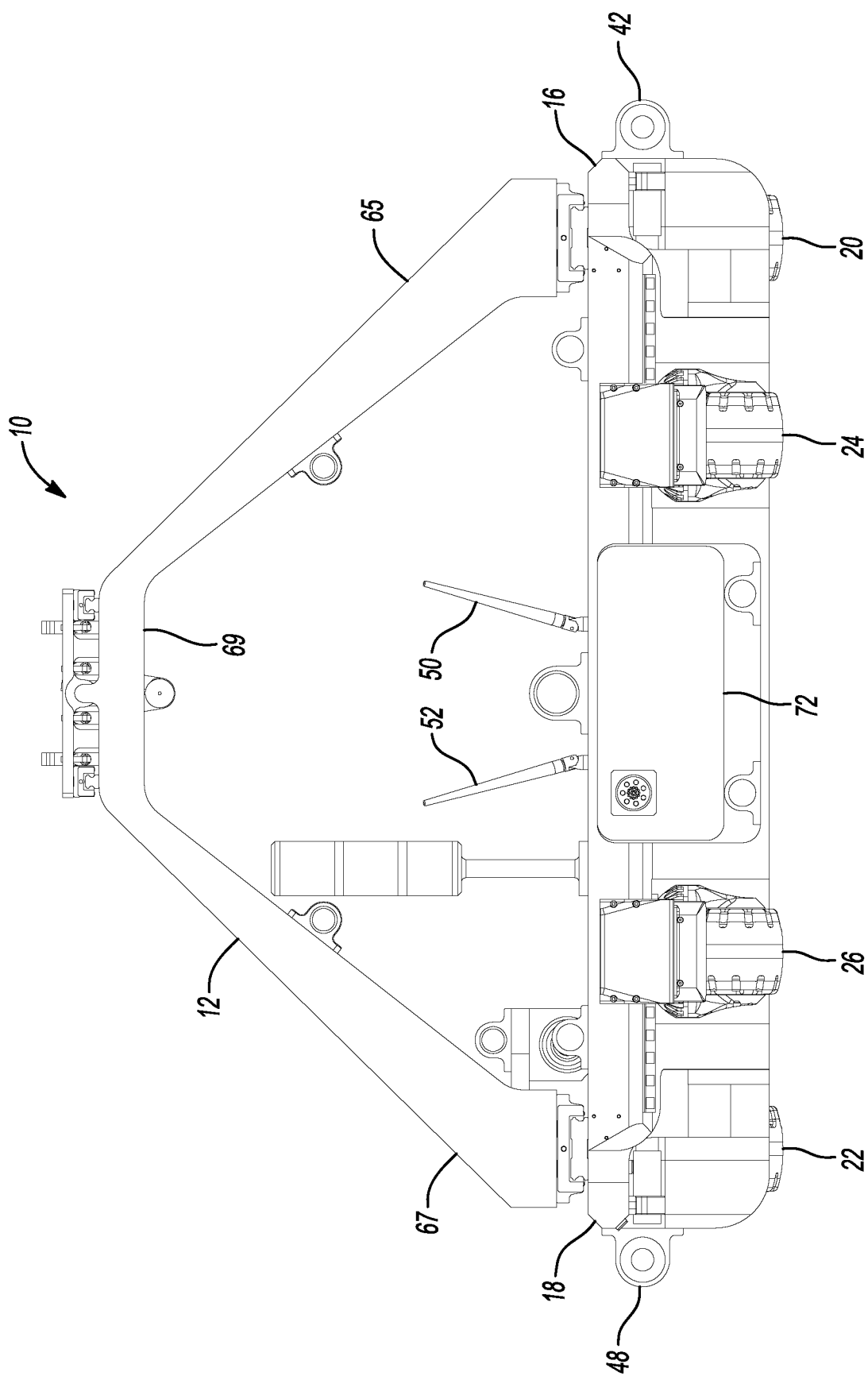
FIG. 3 shows a rear view of the circuit breaker racking system shown in FIG. 1.
Figure 4:
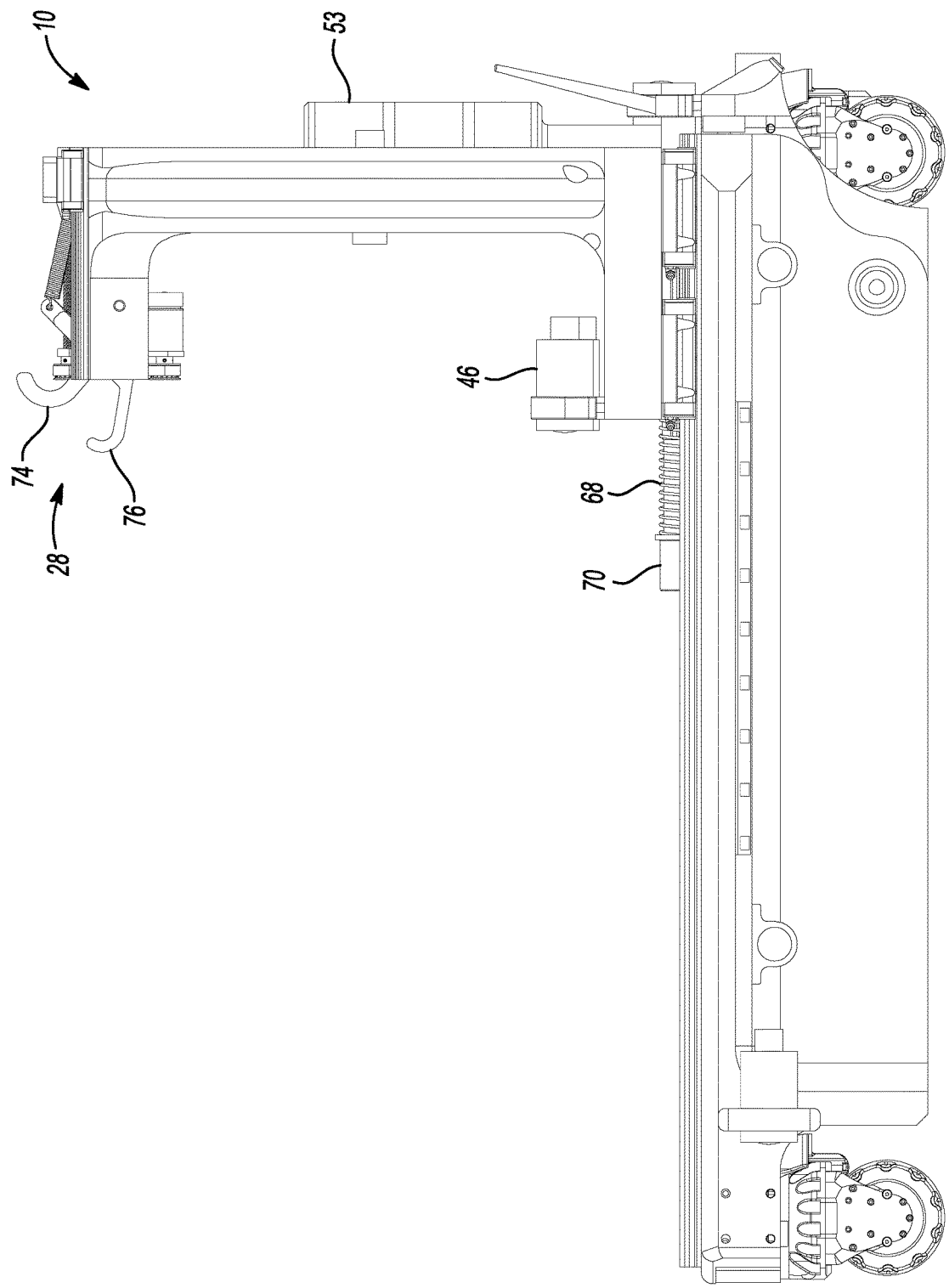
FIG. 4 shows a side view of the circuit breaker racking system shown in FIG. 1.
Figure 12:
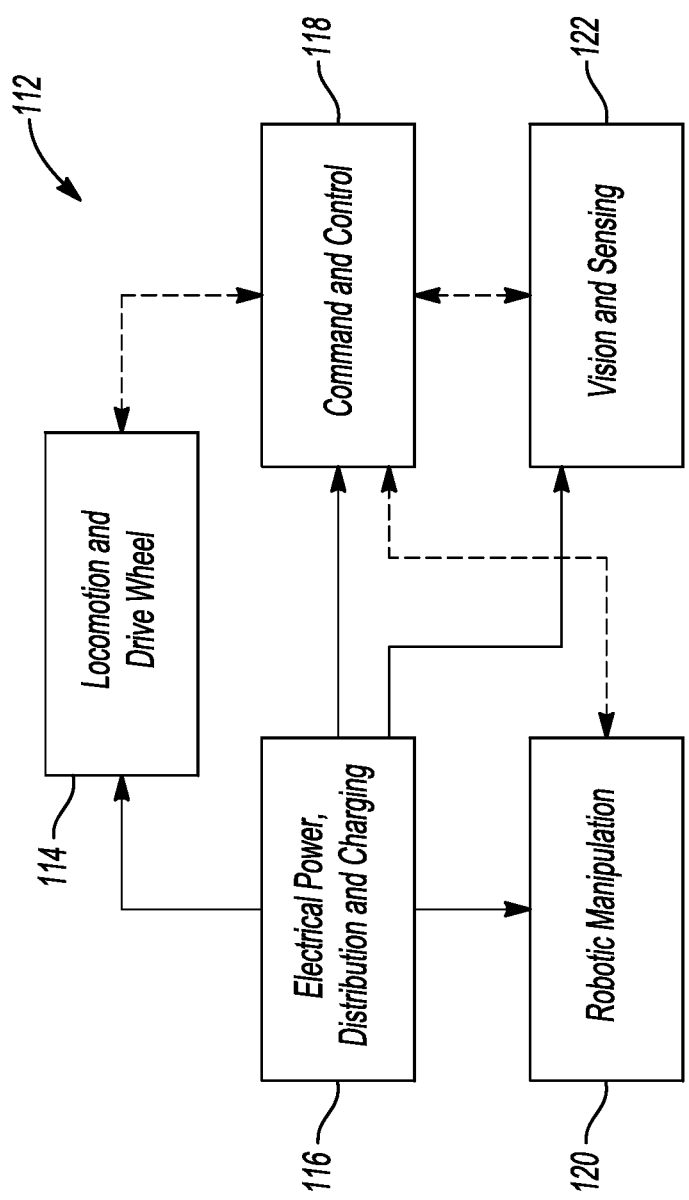
FIG. 12 shows a functional block diagram of major components associated with the circuit breaker racking system.

FIG. 3 shows a rear view of the system 10, which provides a more detailed view of several features. The frame 12 includes first and second legs 65, 67 and a top portion 69, which defines an intersection of the legs 65, 67. The legs 65, 67 are attached to the respective arms 16, 18 at one end, and are attached to each other at their other ends at the top portion 69. As shown in FIG. 3, the hook arrangement 28 is also attached at the top portion 69. The rear wheels 24, 26, like the front wheels 20, 22, are rotatable around respective vertical axes, which makes the system 10 maneuverable in surroundings where very little space is available, such as is often found in control rooms where circuit breakers are housed. As an alternative to the wheels 20, 22, 24, 26, other types of wheels may be used, for example, Mecanum wheels, or even non-wheel drive mechanisms. Also shown in the rear view of the system 10 is a control system 72, to which the antennas 50, 52 are attached. The control system 72 may be made up of any number of hardware or software controllers that can communicate to and from an operator control station from which an operator may be controlling the system 10. A functional block diagram of one possible configuration for such a controller is illustrated in FIG. 12. FIG. 4 shows a side view of the system 10 where two additional hooks 74, 76 of the hook arrangement 28 are illustrated. In other embodiments, more hooks, fewer hooks, or devices or subsystems other than hook arrangements may be used.

Figure 5:
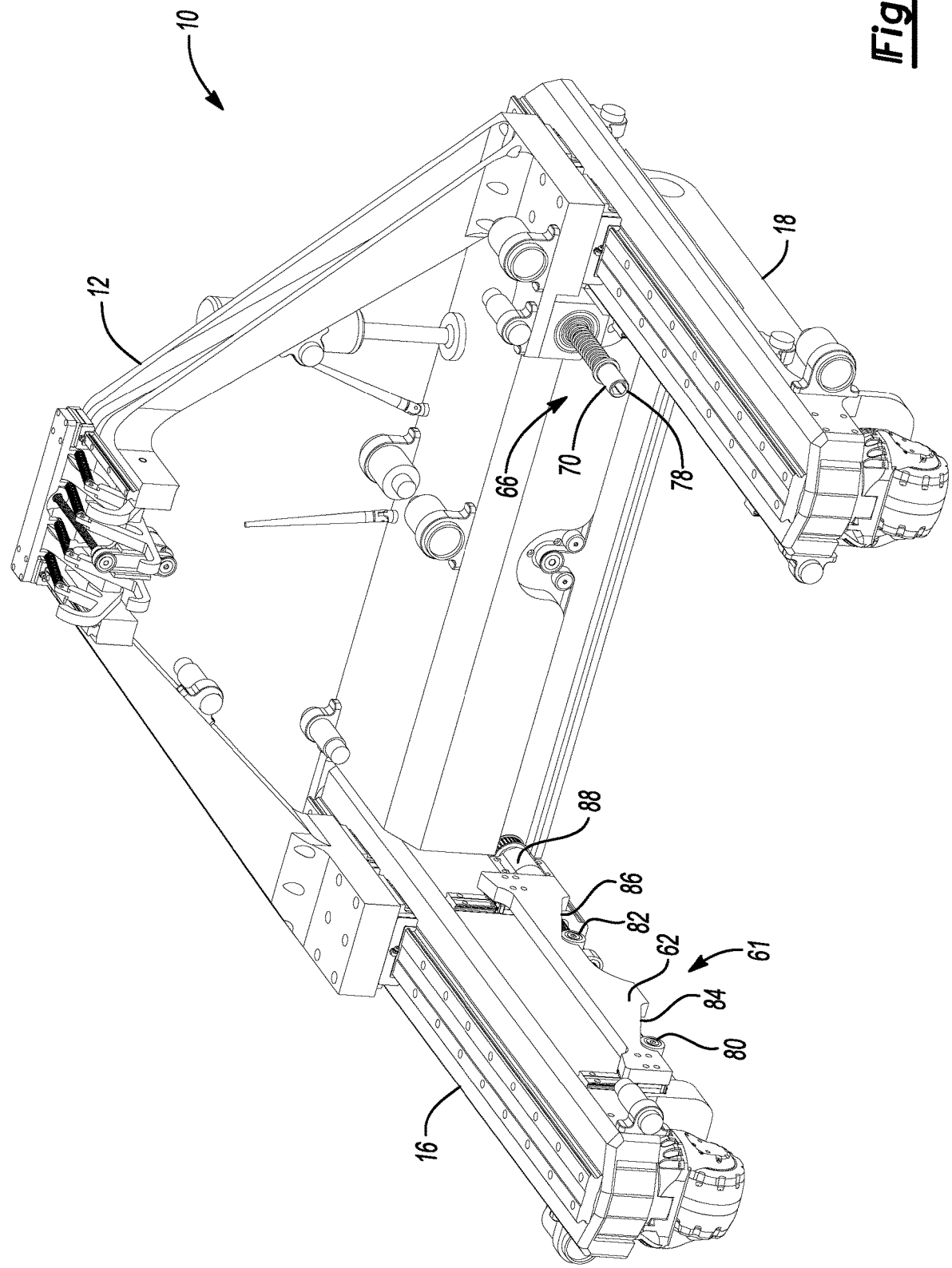
FIG. 5 shows a perspective front view of a circuit breaker racking system in accordance with embodiments described herein.
Figure 6:
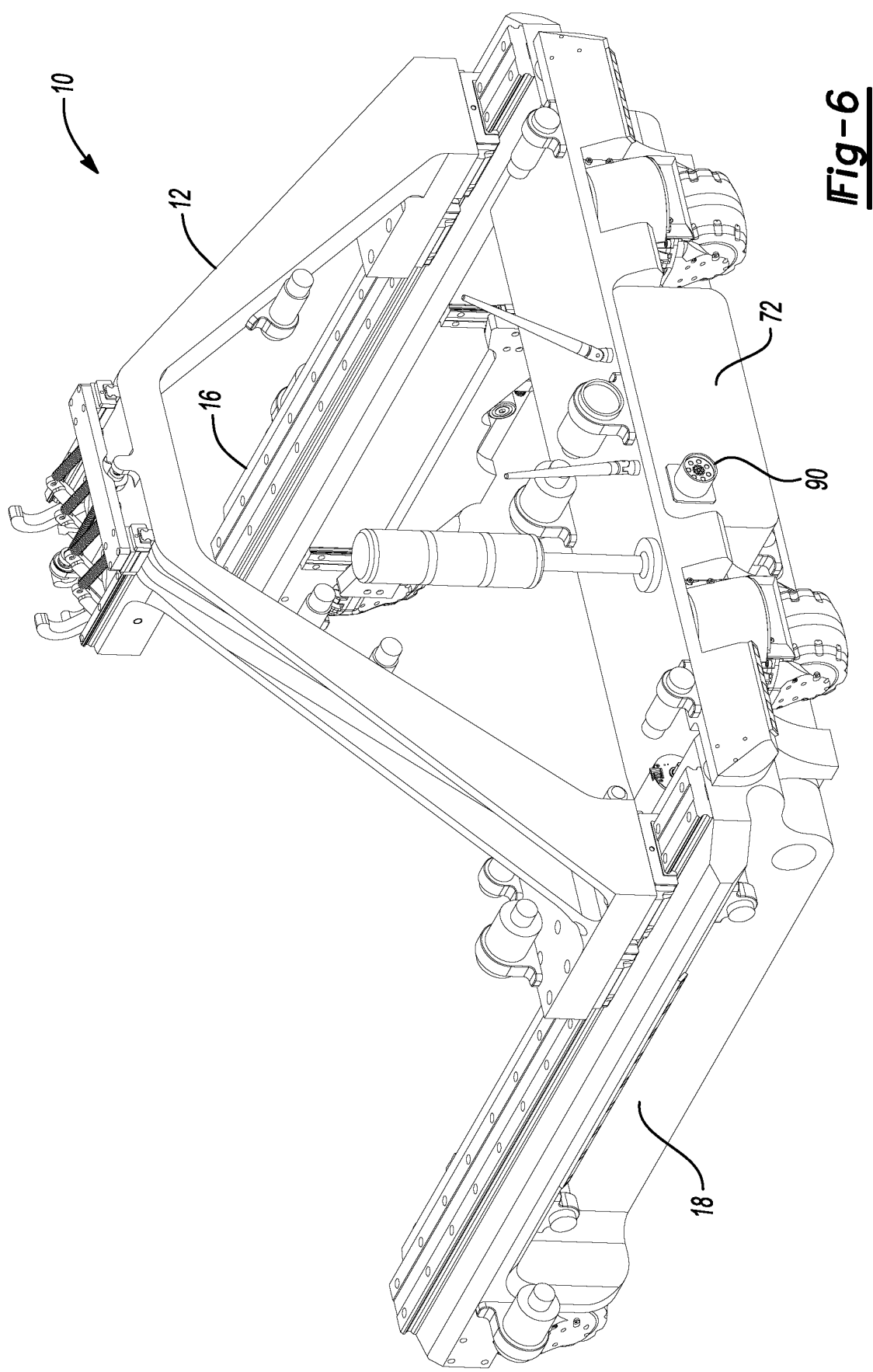
FIG. 6 shows a perspective rear view of the circuit breaker racking system shown in FIG. 5.

FIG. 5 shows a front perspective view of the system 10. In FIG. 5, the hexagonal opening 78 of the head 70 on the screw-drive assembly 66 is shown. Also shown in FIG. 5 is the rail 62 attached to the arm 16. The lift arrangement 61 also includes two rollers 80, 82. The rail 62 is disposed on the two rollers 80, 82, which are attached to the arm 16. Cooperating with the rollers 80, 82 are ramped or slotted portions 84, 86 of the rail 62. The lift arrangement further includes a drive mechanism 88, which is configured to move the rollers 80, 82 rearward along the ramped portions 84, 86, which moves the rail 62 upward to lift the breaker when it is positioned on the rails 62, 64. The drive mechanism 88 is also operable to move the rollers 80, 82 forward along the ramped operations 84, 86, which moves the rail 62 downward. The drive mechanism 88 is engaged after the rail 62 is positioned below the circuit breaker. It is understood that a similar roller and drive mechanism is associated with the rail 64 attached to the opposite arm 18—see FIG. 2. FIG. 6 shows a rear perspective view of the system 10. As shown in this view, the control system 72 includes a port 90 for providing power to, or communications to and from the control system 72.

Figure 7:
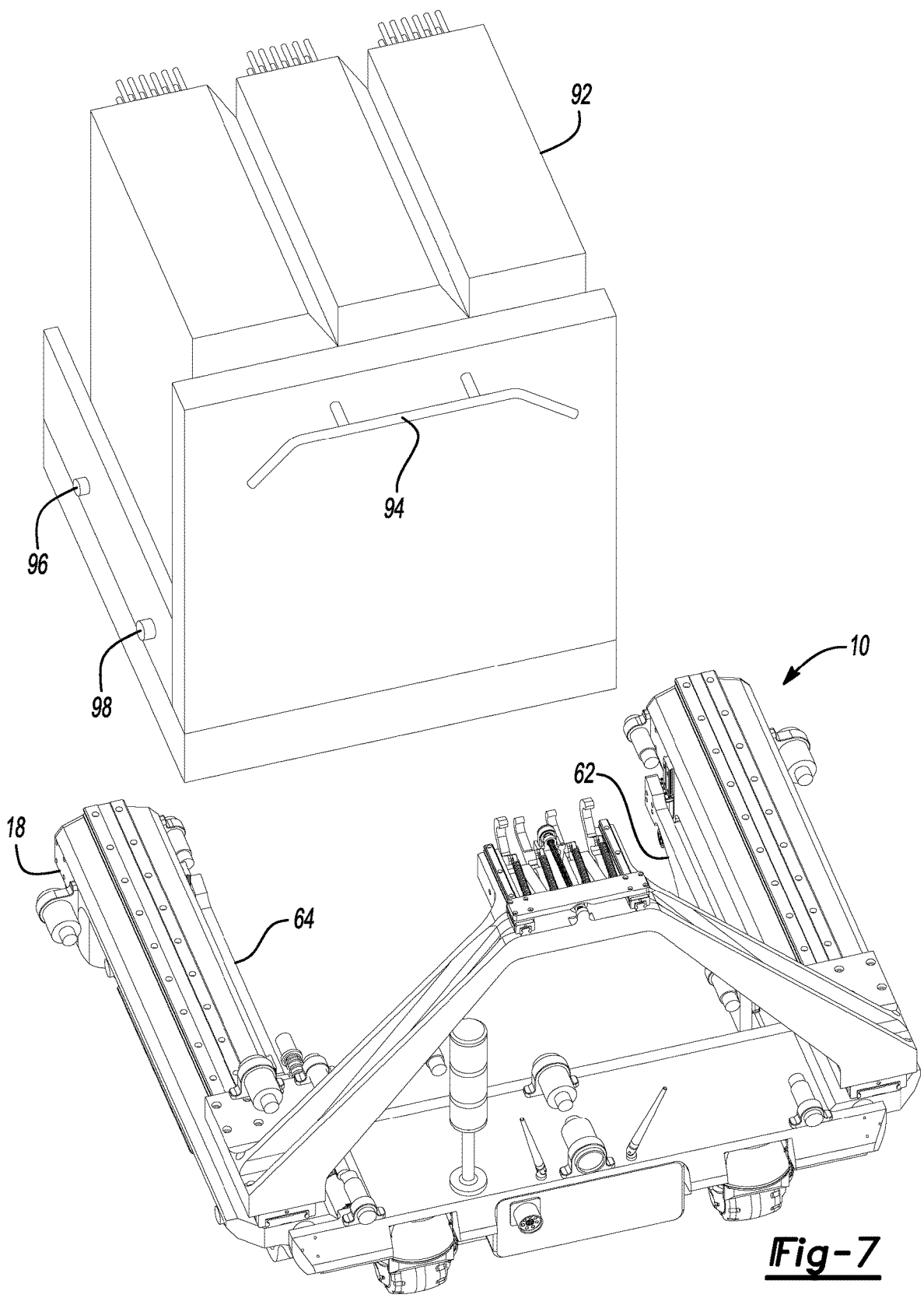
FIG. 7 shows the circuit breaker racking system being aligned with a circuit breaker that is out of its cabinet.
Figure 8:
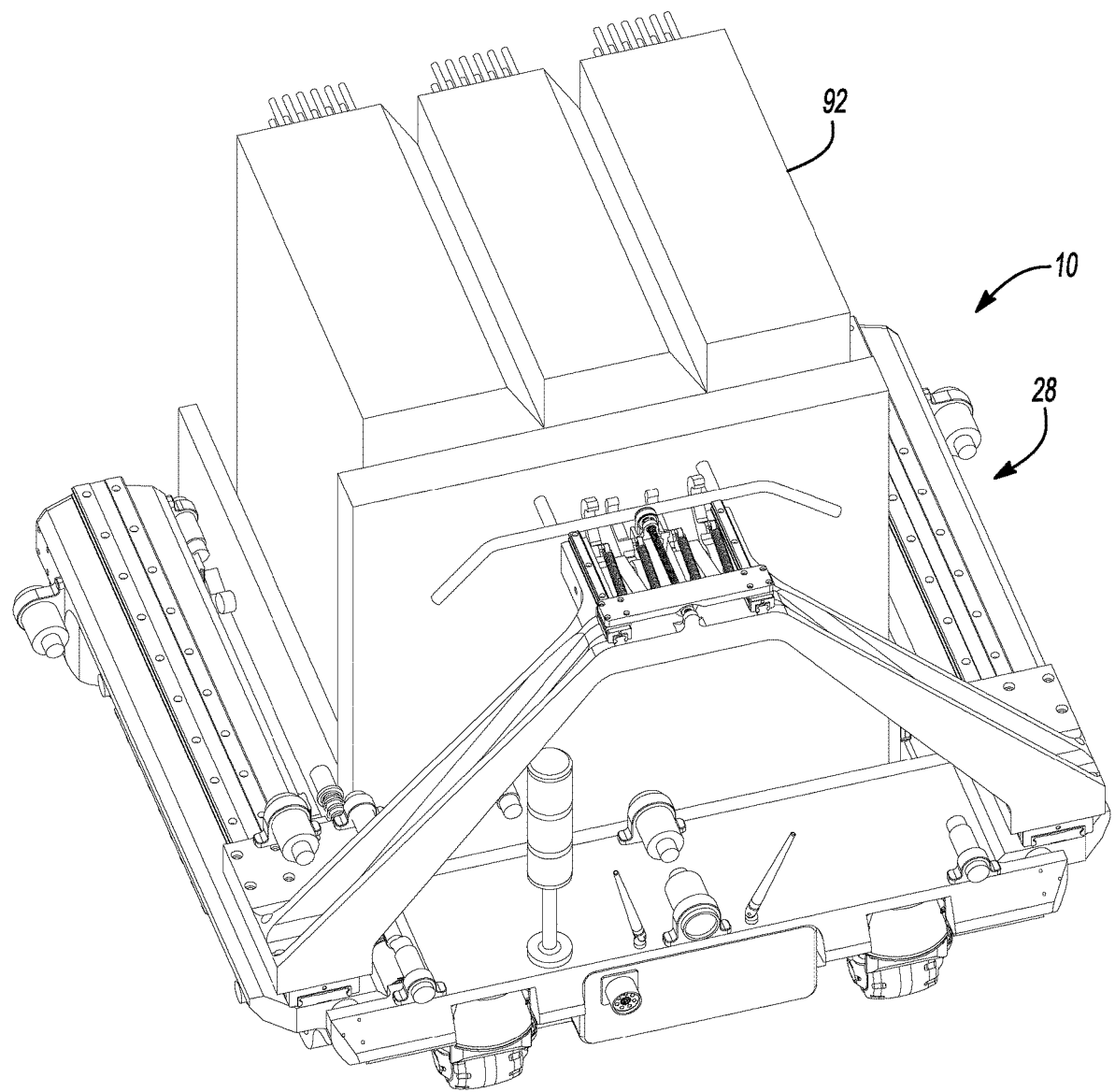
FIG. 8 shows the circuit breaker racking system being positioned relative to the circuit breaker so the circuit breaker can be lifted.
Figure 9:
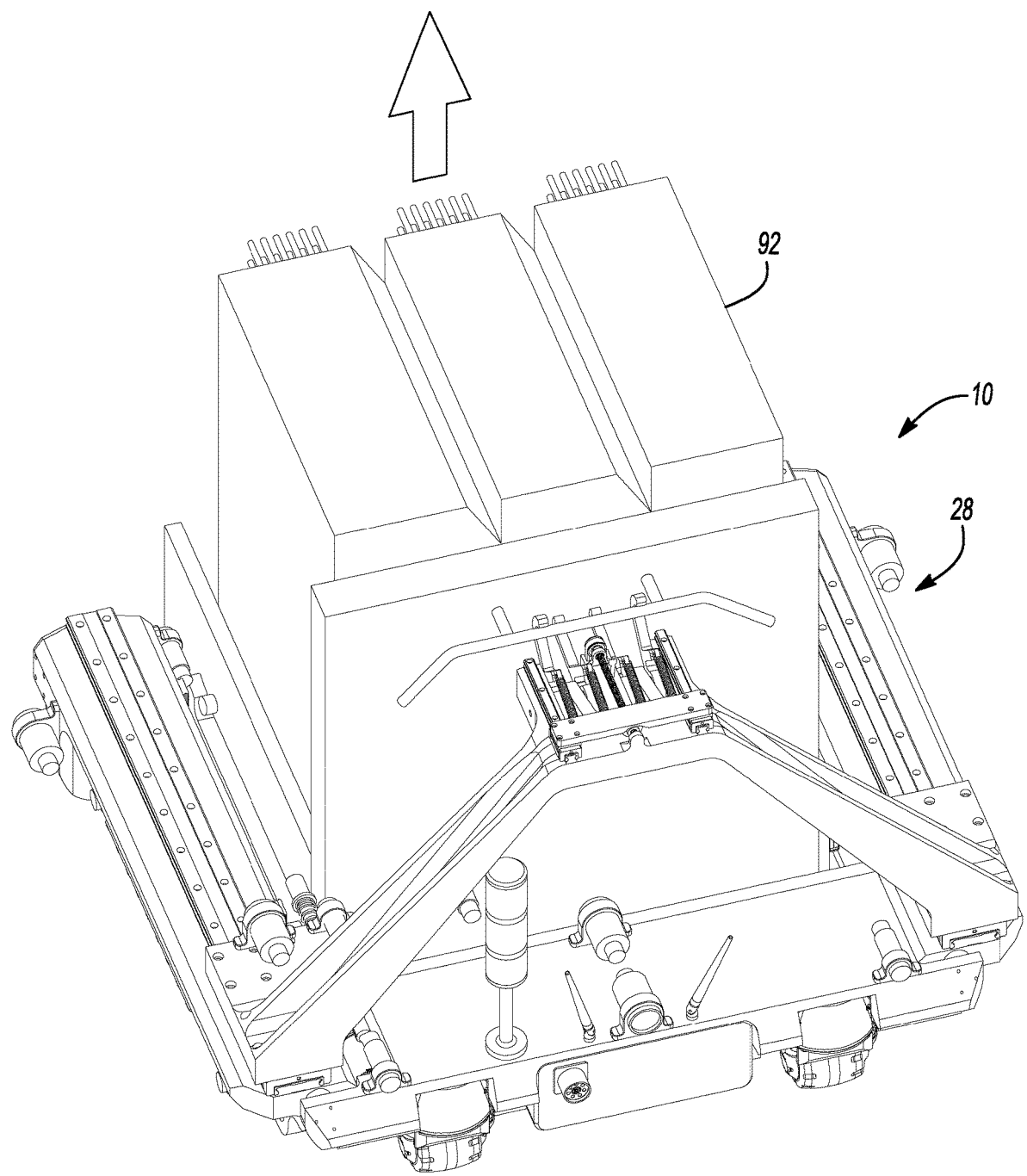
FIG. 9 shows the circuit breaker racking system after lifting the circuit breaker so it can be transported.

FIGS. 7, 8, 9 show the system 10 aligning with, positioning under, and lifting a circuit breaker 92, respectively. As shown, for example, in FIG. 7, the circuit breaker 92 includes a handlebar 94, which is often used in manual installation and removal of the circuit breaker 92. As shown in FIGS. 8 and 9, the system 10 engages the handlebar 94 using the hook arrangement 28. As shown in FIG. 7, the circuit breaker 92 has a pair of rollers 96, 98 on one side, and although they are not visible in FIG. 7, it is understood that a second pair of rollers is disposed on the opposite side of the circuit breaker 92. In FIG. 7, both of the rails 62, 64 are in their respective lowered positions see, for example, the rail 62 as shown in FIG. 5. This allows the system 10 to be positioned under the rollers 96, 98—and the pair of rollers on the other side of the circuit breaker 92—as shown in FIG. 8.

Once the system 10 is in the position shown in FIG. 8, the drive mechanism 88 and the drive mechanism associated with the rail 64 are then engaged, which moves the rails 62, 64 upward. As the rails 62, 64 move upward, they engage the rollers 96, 98 and the other pair of rollers on the circuit breaker 92, which lifts the circuit breaker 92 several inches off the floor. With the circuit breaker 92 lifted as shown in FIG. 9, the system 10 can then move the circuit breaker 92 into position and install it in its cabinet. A system in accordance with embodiments described herein, such as the system 10, may be manually moved and manipulated by an operator, or the system may be remotely controlled such that the operator need not be in the control room where the circuit breaker is installed. As described above, the control system 72 can wirelessly send and receive signals, which may be used to control individual features of the system 10, such as the raising and lowering of the rails 62, 64, and may also be used to control movement of the system 10 in its entirety, for example, by changing the orientation and speed of the wheels 20, 22, 24, 26, each of which may have a separate drive motor or motors for controlling its angular orientation and rotational speed.

Figure 10:
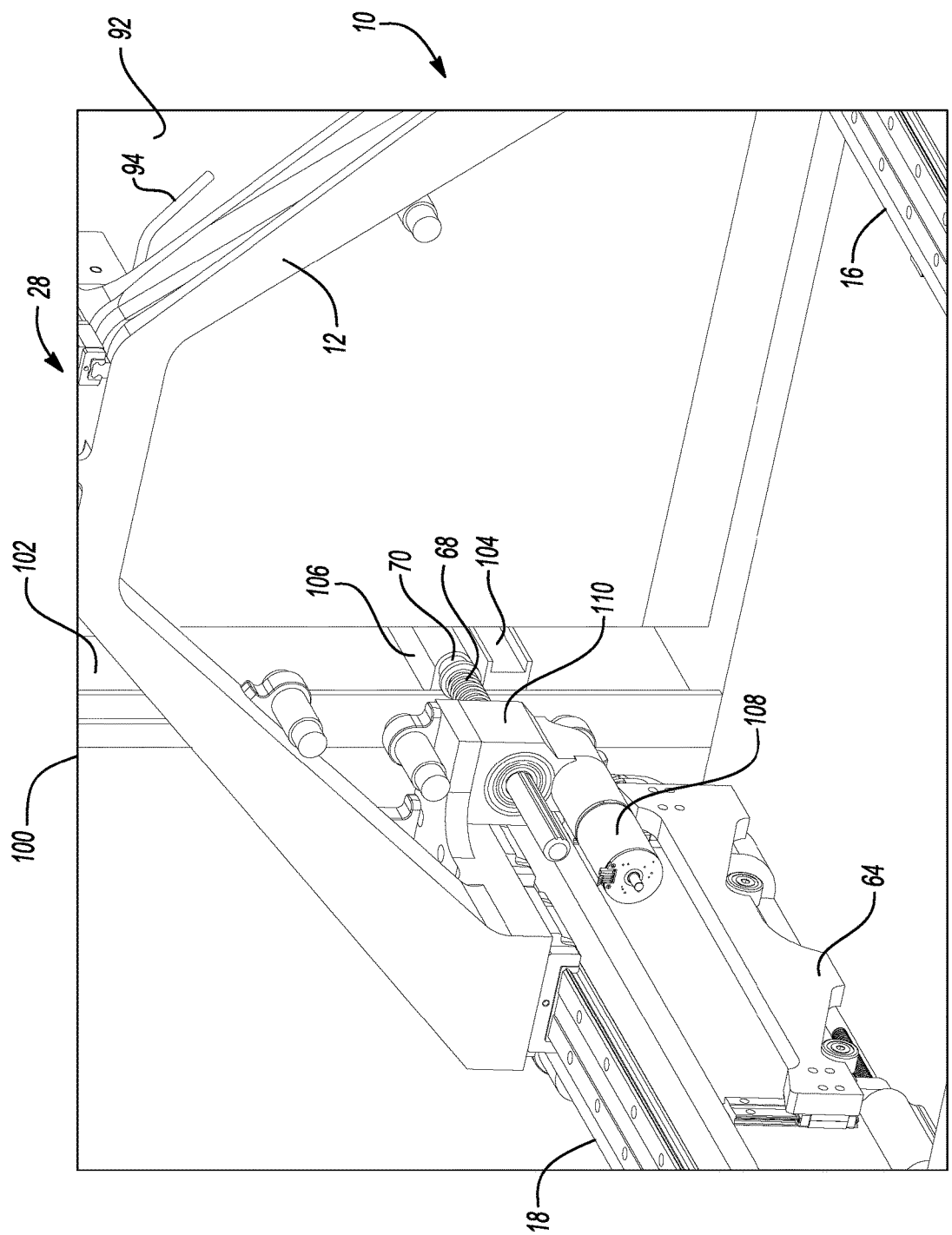
FIG. 10 shows the circuit breaker racking system having moved the circuit breaker back into its cabinet and engaging a lead screw for final positioning of the circuit breaker in the cabinet.

FIG. 10 shows the system 10 after it has positioned the circuit breaker 92 inside its circuit-breaker cabinet 100. More specifically, the system 10 was maneuvered into position directly in front of an opening 102 in the cabinet 100, and the A-frame 12 was moved forward along the arms 16, 18. This moves the circuit breaker 92 from the rear of the system 10—see, for example, FIG. 9—forward into the opening 102 of the cabinet 100. A rail 104 disposed in the cabinet 100 supports a screw 106 that can be rotated to move the circuit breaker 92 farther back in the cabinet 100. Embodiments of systems described herein, such as the system 10, can also actuate the screw 106 remotely to allow an operator to remain outside of the control room even during this final stage.

Figure 11:
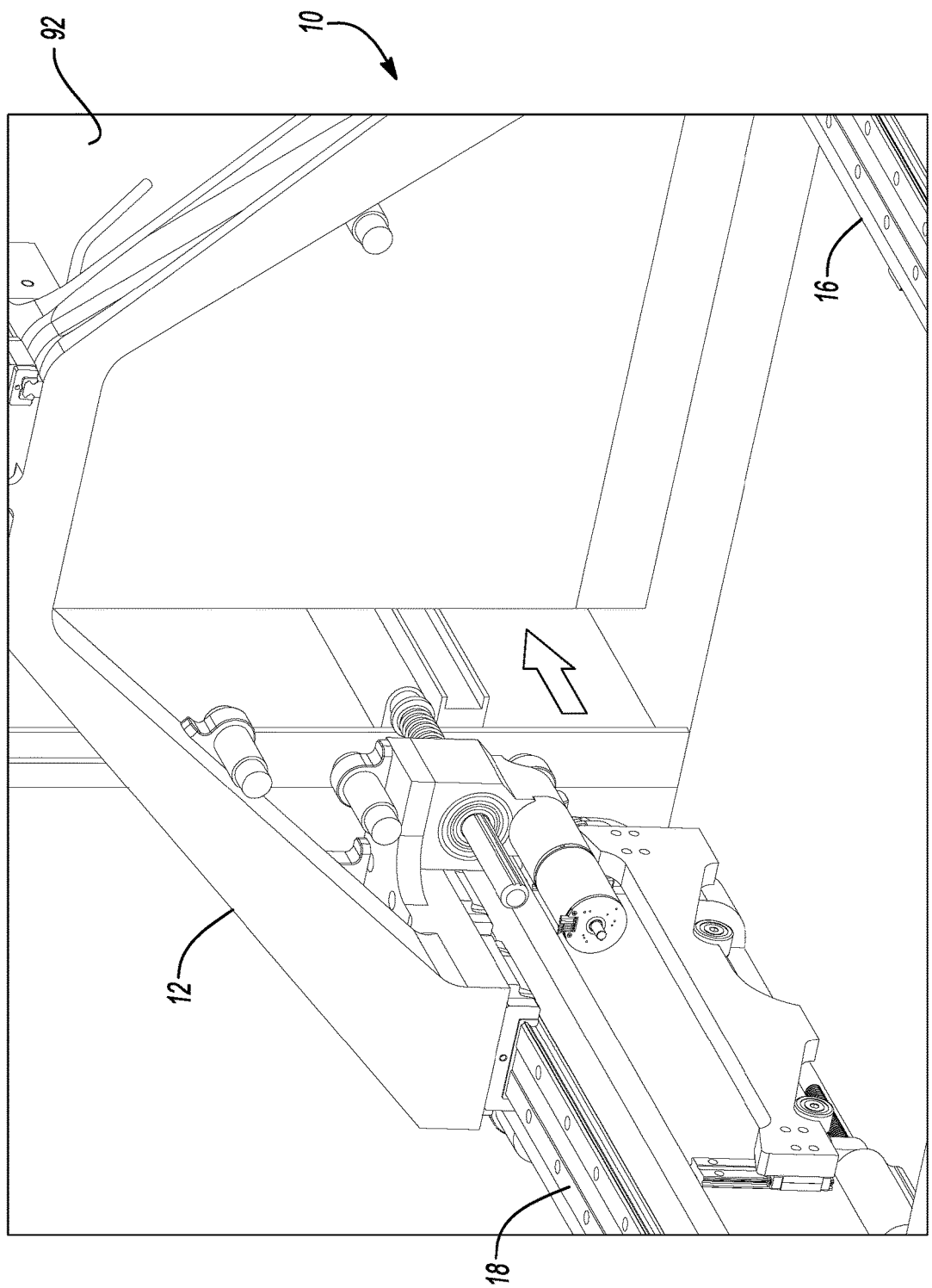
FIG. 11 shows the circuit breaker racking system having engaged the lead screw and positioned the circuit breaker in its final position within the cabinet.

As shown in FIG. 10, the head 70 of the screw-drive assembly 66 engages with the screw 106. The drive screw 68 is rotated by a motor 108 and gearbox 110. This moves the circuit breaker 92 farther back in the cabinet 100. In FIG. 11, the circuit breaker 92 is now in position and connected to its electrical circuit; in general, the circuit breaker 92 is connected to an electrical power source, but more specifically, it may complete a circuit in a line, or otherwise be connected to an electrical load. The A-frame 12 may now be returned to its starting position toward a rear of the system 10 by moving it along the arms 16, 18. Of course, removing a circuit breaker from a cabinet can also be performed remotely by reverse-rotating the screw 106 to bring the circuit breaker 92 back out toward the front of the cabinet. Then, the hook arrangement 28 can be actuated to attach to the handlebar 94, and the circuit breaker 92 can be pulled rearward as the A-frame 12 is moved rearward along the arms 16, 18.

FIG. 12 shows a functional block diagram 112 illustrating a functional arrangement in accordance with embodiments described herein. In the diagram 112, there are separate control blocks for various functions within the system 10. Specifically, control of locomotion and drive wheels is shown at block 114, control of electrical power, distribution and charging is shown at block 116, command-and-control is shown at block 118, robotic manipulation is shown at block 120, and vision and steering is shown at block 122. In the block diagram 112, the solid lines between the various control blocks indicate a transfer of electrical power, and the dashed lines between the control blocks indicate the transfer of data, which could be command data, feedback data, or both. Some or all of these control blocks may be located, for example, within a control system, such as the control system 72 illustrated and described above. There may be a complementary set of control blocks in a control system positioned remotely from the system 10 such that each of the various subsystems within the system 10 can be independently controlled by a remotely-located operator.

Figure 13:
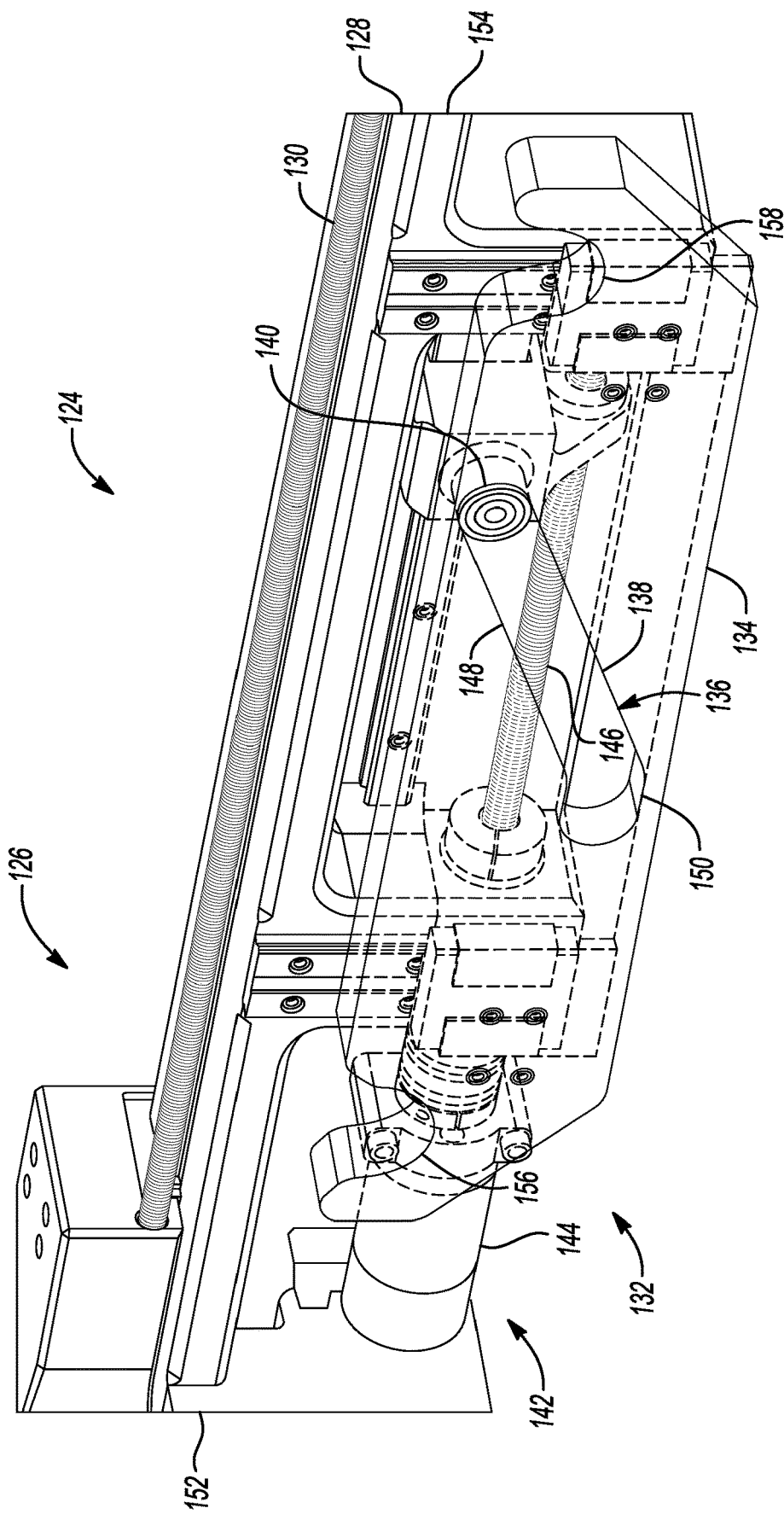
FIG. 13 shows a perspective view of one of the lift rails and its drive system.

FIG. 13 shows a perspective view of a portion of a circuit breaker racking system 124 in accordance with embodiments described herein. Specifically, a portion of a support structure 126 is illustrated. The support structure 126 includes an arm 128 configured similarly to the arm 18 illustrated in FIG. 1. The support structure 126 may, for example, include a frame such as the A-frame structure 12, that moves fore and aft along the arm 128, driven by a drive screw system 130. It is understood that a second arm may be disposed opposite the arm 128 similar to the configuration of the arms 16, 18 shown in FIGS. 1 and 2.

FIG. 13 also shows a portion of a lift arrangement 132. The lift arrangement 132 includes a rail 134 that is movably attached to the arm 128. The rail 134 includes a ramped portion, which in this embodiment is a slotted portion 136.

The slotted portion 136 is disposed within the rail 134 to form a closed boundary 138. In contrast, the slotted portions 84, 86 of the rail 62 shown in FIG. 5 are open to the bottom of the rail 62 and do not form a closed boundary. The configuration shown in FIG. 13 may accommodate heavier circuit breakers, some of which may weigh several hundred pounds. The lift arrangement 132 includes a roller 140 attached to the arm 128. The roller 140 is driven by a drive system 142 that includes a motor 144 and a drive screw 146. The slotted portion 136 includes a ramped profile having a profile portion 148 that is disposed at an oblique angle to the arm 128; it also includes a profile portion 150 that is disposed parallel to the arm 128.

In order to engage the lift arrangement 132, the drive system 142 is operated to move the roller 140 horizontally. As shown in FIG. 13, the vertical position of the roller 140 is fixed; therefore, as the roller 140 moves horizontally, the rail 134 moves according to the profile of the slotted portion 136. As the rail 134 moves along the roller 140 when it is in the angled profile 148, the rail 134 moves upward if the roller 140 is moving toward a rear 152 of the support structure 126, and it moves downward if the roller 140 is moving toward a front 154 of the support structure 126. When the roller 140 is in the horizontal profile portion 150, the rail 134 is raised to its highest position. Here it can maintain a heavy load without the weight of the load forcing the rail 134 downward to back-drive the motor 144. The rail 134 also includes two concave portions 156, 158, which are configured to receive wheels often attached to the side of a circuit breaker. The lift arrangements 61, 132 described herein provide a relatively uncomplicated way to lift a very heavy load over a short distance, which may be a very desirable quality for racking and unracking large circuit breakers.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A circuit breaker racking system, comprising:
   a support structure including first and second arms disposed opposite each other for positioning along opposite sides of a circuit breaker; and
   a lift arrangement including a first rail disposed on the first arm and configured to engage a first side of the circuit breaker, a second rail disposed on the second arm and configured to engage a second side of the circuit breaker, and a drive system operable to raise the first and second rails such that the circuit breaker is raised, wherein the first and second rails each include a respective ramped portion, the lift arrangement further including a first roller positioned to contact the ramped portion of the first rail and a second roller positioned to contact the ramped portion of the second rail, the drive system being operable to move the first and second rollers horizontally to raise the first and second rails.

2. The system of claim 1, wherein each of the ramped portions includes a profile having a portion disposed at an oblique angle to the arms and another portion disposed parallel to the arms.

3. The system of claim 1, wherein each of the first and second rails includes two ramped portions, and the lift arrangement includes two of the first rollers and two of the second rollers.

4. The system of claim 1, wherein each of the first and second rails are configured with at least one concave portion to receive a respective wheel on the respective sides of the circuit breaker.

5. The system of claim 1, wherein each of the ramped portions is disposed completely within a respective rail.

6. The system of claim 1, wherein the support structure further includes a frame having a first leg attached to the first arm, a second leg attached to the second arm, and a top portion defining an intersection of the first and second legs, the system further comprising a hook arrangement attached to the top portion and configured to engage a portion of the circuit breaker.

7. The system of claim 6, wherein the frame is movable along the first and second arms for moving the circuit breaker into and out of a circuit-breaker cabinet.

8. The system of claim 6, further comprising a screw-drive assembly disposed on the support structure and configured to engage a drive screw on a circuit-breaker cabinet to move the circuit breaker forward and rearward in the circuit-breaker cabinet.

9. A circuit breaker racking system, comprising:
   a support structure including a pair of arms disposed across from each other for positioning along respective sides of a circuit breaker; and
   a lift arrangement including a pair of rails each attached to a respective one of the arms and including a slotted portion, and a pair of rollers each configured to move along a respective one of the slotted portions to move the rails upward and downward for raising and lowering the circuit breaker.

10. The system of claim 9, wherein the support structure further includes a frame having a pair of legs connected to each other at one end and each having another end attached to a respective one of the arms, the legs having a hook arrangement attached thereto at the one end configured to engage a portion of the circuit breaker.

11. The system of claim 10, wherein the frame is movable along the arms for moving the circuit breaker into and out of a circuit-breaker cabinet.

12. The system of claim 9, further comprising a screw-drive assembly disposed on the support structure and configured to engage a drive screw on a circuit-breaker cabinet to move the circuit breaker forward and rearward in the circuit-breaker cabinet.

13. The system of claim 9, wherein each of the slotted portions is disposed completely within a respective rail.

14. The system of claim 13, wherein each of the slotted portions includes a profile portion disposed at an oblique angle to the arms and a profile portion disposed parallel to the arms.

15. The system of claim 13, wherein each of the rails includes two of the slotted portions, and the lift arrangement includes two of the rollers for each of the rails.

* * * * *